(12) United States Patent
Cha et al.

(10) Patent No.: US 10,406,988 B2
(45) Date of Patent: Sep. 10, 2019

(54) CARRIER APPARATUS FOR VEHICLES

(71) Applicants: HYUNDAI MOTOR COMPANY, Seoul (KR); KIA MOTORS CORPORATION, Seoul (KR)

(72) Inventors: Dong Eun Cha, Seongnam-si (KR); Hyun Gyung Kim, Hwaseong-si (KR); Keun Sig Lim, Hwaseong-si (KR); Jin Young Yoon, Gimpo-si (KR); Ki Hong Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/813,569

(22) Filed: Nov. 15, 2017

(65) Prior Publication Data

US 2019/0031110 A1    Jan. 31, 2019

(30) Foreign Application Priority Data

Jul. 25, 2017    (KR) .................. 10-2017-0094158

(51) Int. Cl.

| B60R 9/00 | (2006.01) |
|---|---|
| B60R 9/048 | (2006.01) |
| B60R 9/042 | (2006.01) |
| B60R 9/045 | (2006.01) |
| B60R 9/06 | (2006.01) |
| B60R 11/04 | (2006.01) |
| B60R 9/08 | (2006.01) |

(52) U.S. Cl.
CPC .............. *B60R 9/048* (2013.01); *B60R 9/042* (2013.01); *B60R 9/045* (2013.01); *B60R 9/06* (2013.01); *B60R 11/04* (2013.01); *B60R 9/08* (2013.01)

(58) Field of Classification Search
CPC . B60R 9/042; B60R 9/058; B60R 2011/0084; B60R 9/04; B60R 9/06; B60R 2011/0092
USPC .................. 224/310, 325–326, 492–495, 562
See application file for complete search history.

(56) References Cited

U.S. PATENT DOCUMENTS

| 3,931,919 | A | * | 1/1976 | Gerber | ...................... B60R 9/10 |
| | | | | | 224/324 |
| 4,548,392 | A | * | 10/1985 | Rickling | ................. F41A 23/00 |
| | | | | | 269/156 |
| 5,154,563 | A | * | 10/1992 | Phillips | ................. B60R 9/0426 |
| | | | | | 224/326 |
| 5,501,342 | A | * | 3/1996 | Geibel | ................... B25H 3/003 |
| | | | | | 206/350 |
| 5,580,204 | A | * | 12/1996 | Hultman | ................. F16B 5/065 |
| | | | | | 24/297 |

(Continued)

FOREIGN PATENT DOCUMENTS

KR    20-0404798 Y1    12/2005

*Primary Examiner* — Adam J Waggenspack
(74) *Attorney, Agent, or Firm* — Morgan, Lewis & Bockius LLP

(57) ABSTRACT

A carrier apparatus for a vehicle includes a stationary rail extending from a rear part of the vehicle to an upper part of the vehicle in a forward-rearward direction of the vehicle; and a position-fixing bracket separably mounted to the stationary rail for fixing cargo placed on the stationary rail, such that the cargo fixed to the stationary rail is located at the rear part or the upper part of the vehicle when the position-fixing bracket is mounted to the stationary rail.

5 Claims, 10 Drawing Sheets

(56) References Cited

U.S. PATENT DOCUMENTS

| | | | | |
|---|---|---|---|---|
| 5,915,572 | A * | 6/1999 | Hancock | A47B 81/005 |
| | | | | 211/64 |
| 6,170,865 | B1 * | 1/2001 | Barron | B60N 2/0276 |
| | | | | 280/735 |
| 6,530,621 | B1 * | 3/2003 | Williams | B60J 7/102 |
| | | | | 224/326 |
| 7,100,808 | B2 * | 9/2006 | Hancock | F16L 3/10 |
| | | | | 224/547 |
| 7,240,960 | B2 * | 7/2007 | Fallis, III | B60J 7/0053 |
| | | | | 296/107.19 |
| 7,337,934 | B2 * | 3/2008 | Alling | F16B 2/10 |
| | | | | 224/401 |
| 7,380,769 | B1 * | 6/2008 | Dorris | B60P 1/4407 |
| | | | | 254/323 |
| 8,137,008 | B1 * | 3/2012 | Mallano | B60R 11/04 |
| | | | | 396/427 |
| 8,382,418 | B2 * | 2/2013 | DiVerdi | B60R 9/0423 |
| | | | | 187/236 |
| 8,387,842 | B2 * | 3/2013 | Elliott | B60R 9/055 |
| | | | | 224/319 |
| 9,205,784 | B2 * | 12/2015 | Clements | B60R 11/02 |
| 2015/0034572 | A1 * | 2/2015 | Kao | B25H 3/04 |
| | | | | 211/13.1 |
| 2015/0202767 | A1 * | 7/2015 | Kao | B25H 3/04 |
| | | | | 211/70.6 |
| 2016/0355143 | A1 * | 12/2016 | Hingne | B60R 11/02 |

* cited by examiner

[FIG. 1]
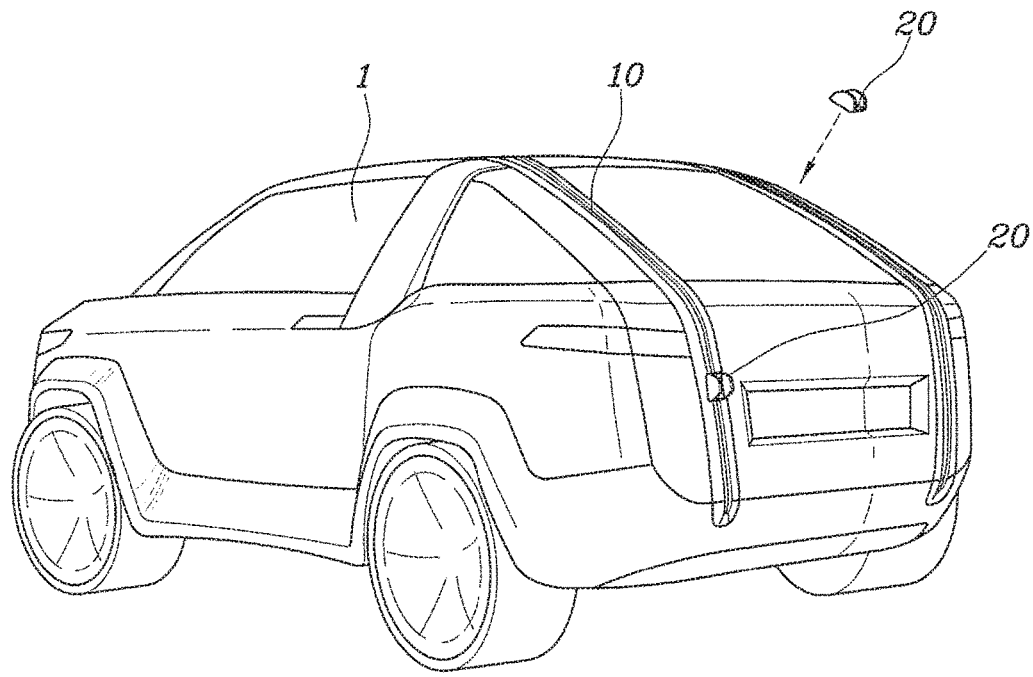
[FIG. 2]
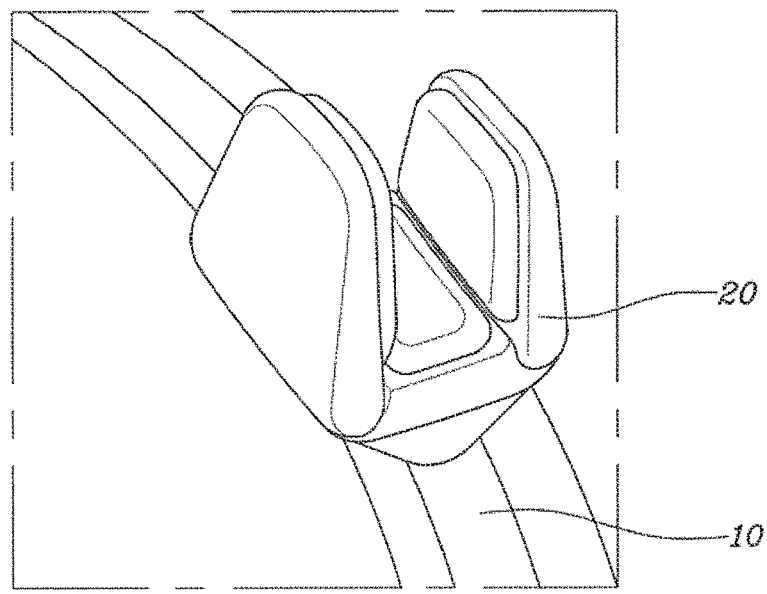

[FIG. 3]
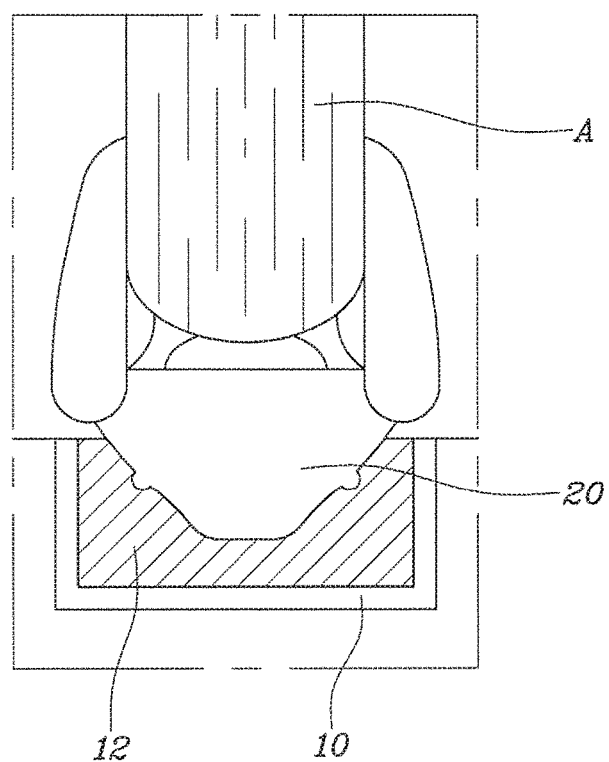

[FIG. 4]
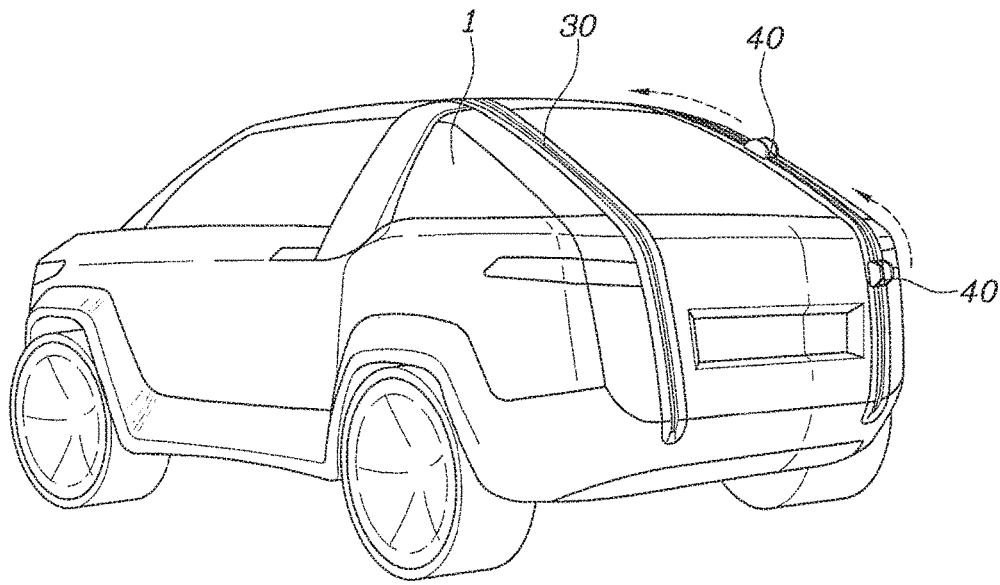
[FIG. 5]
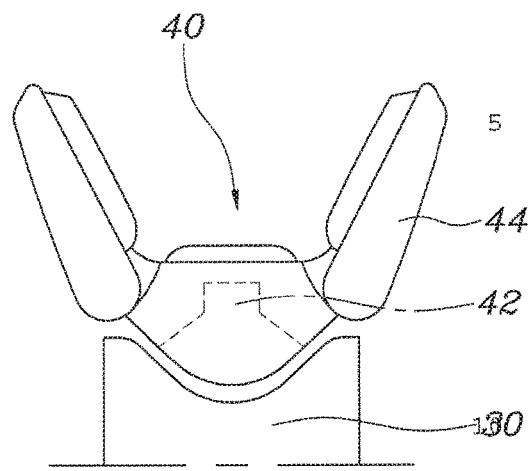

[FIG. 6]
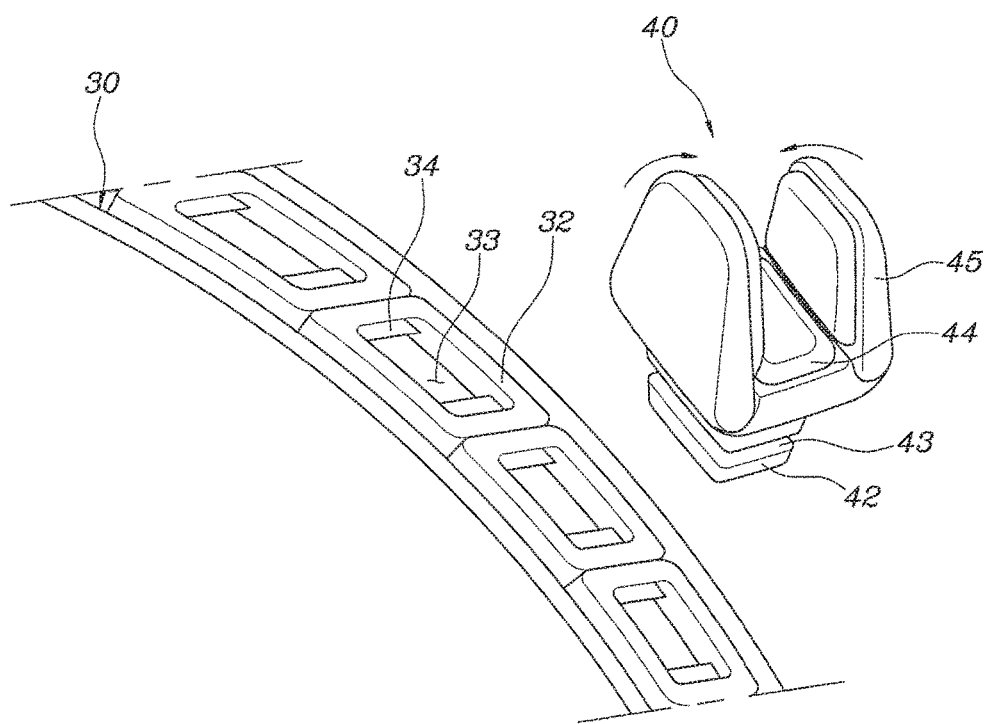

[FIG. 7]
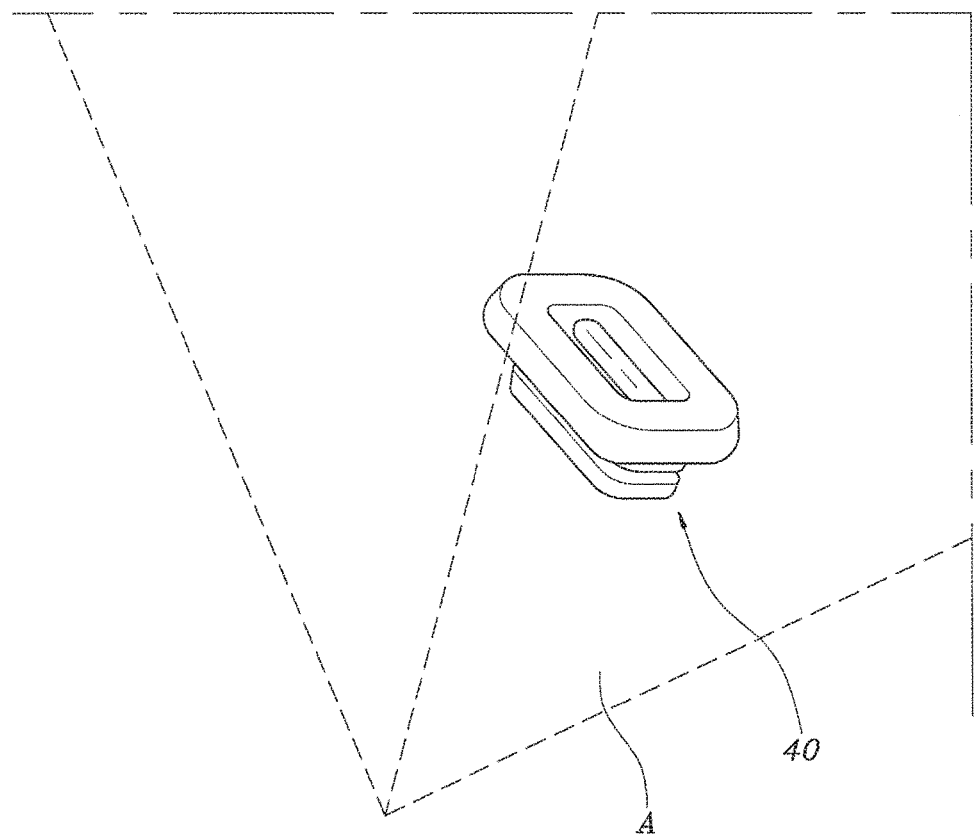

[FIG. 8]
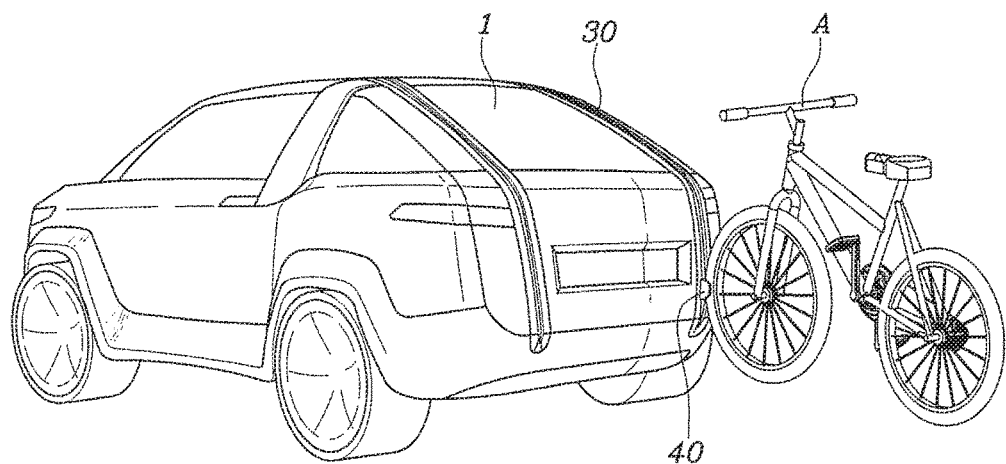
[FIG. 9]
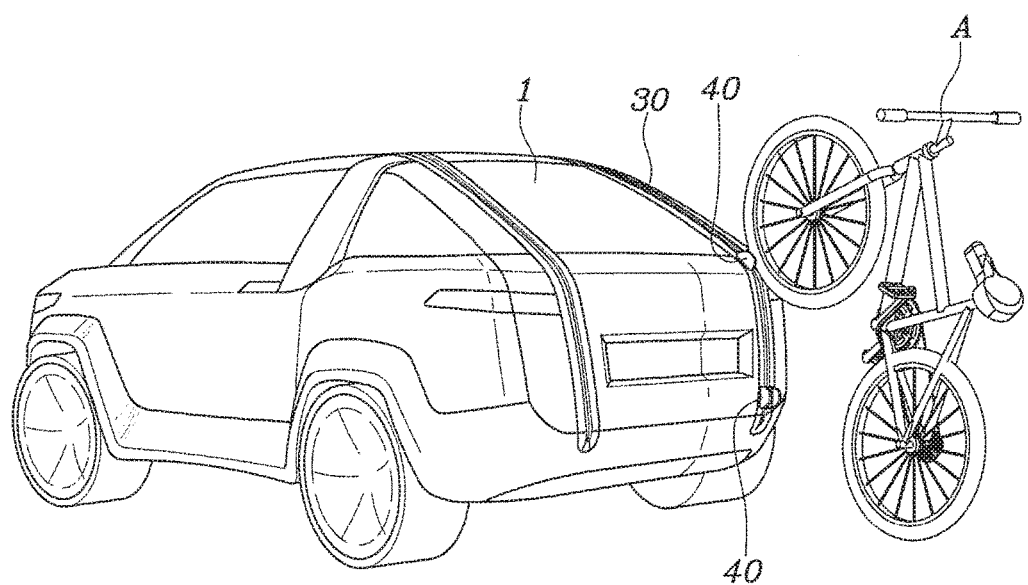

[FIG. 10]
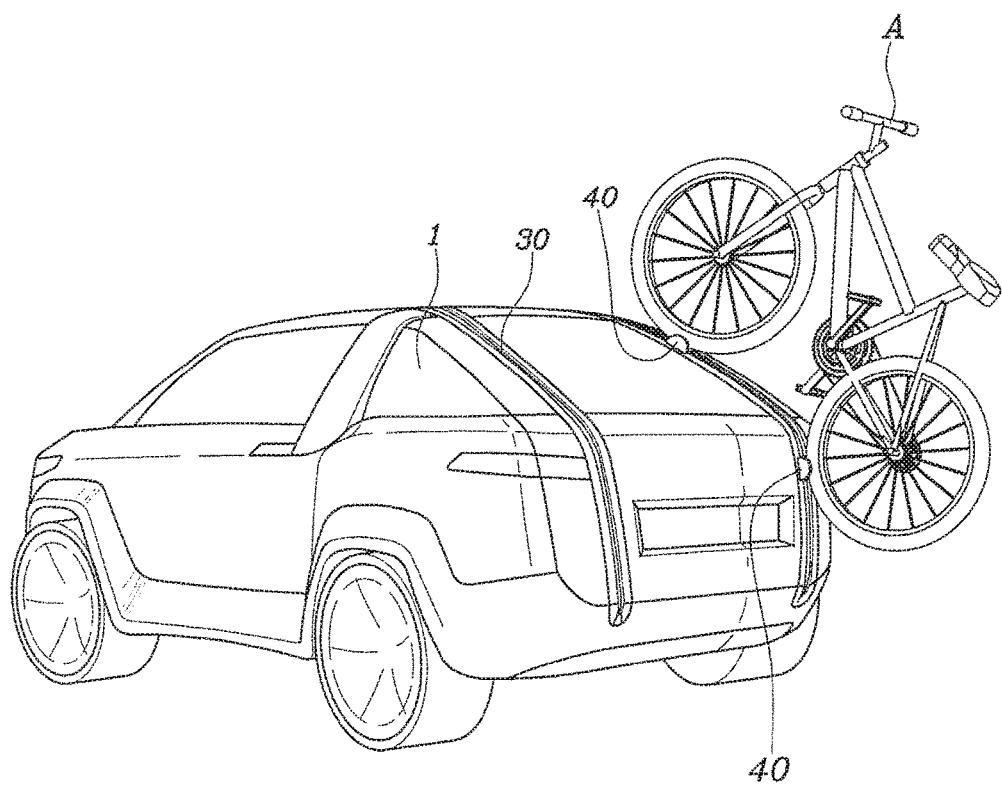

[FIG. 11]
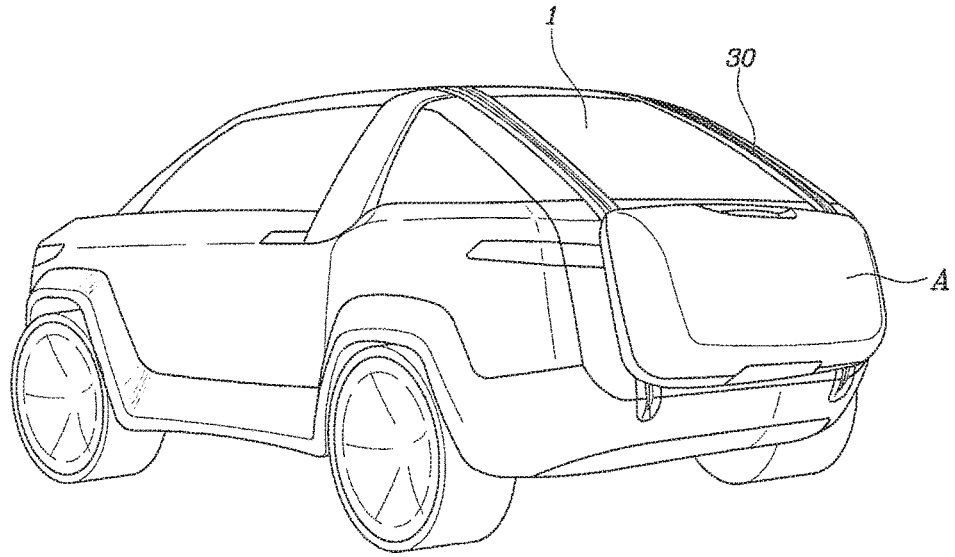
[FIG. 12]
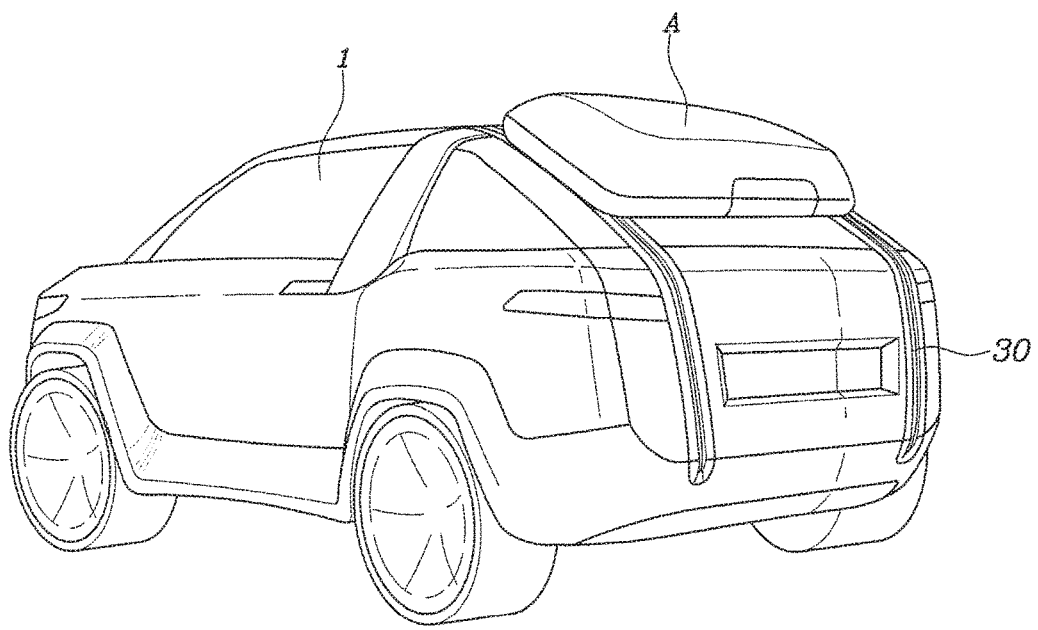

[FIG. 13]
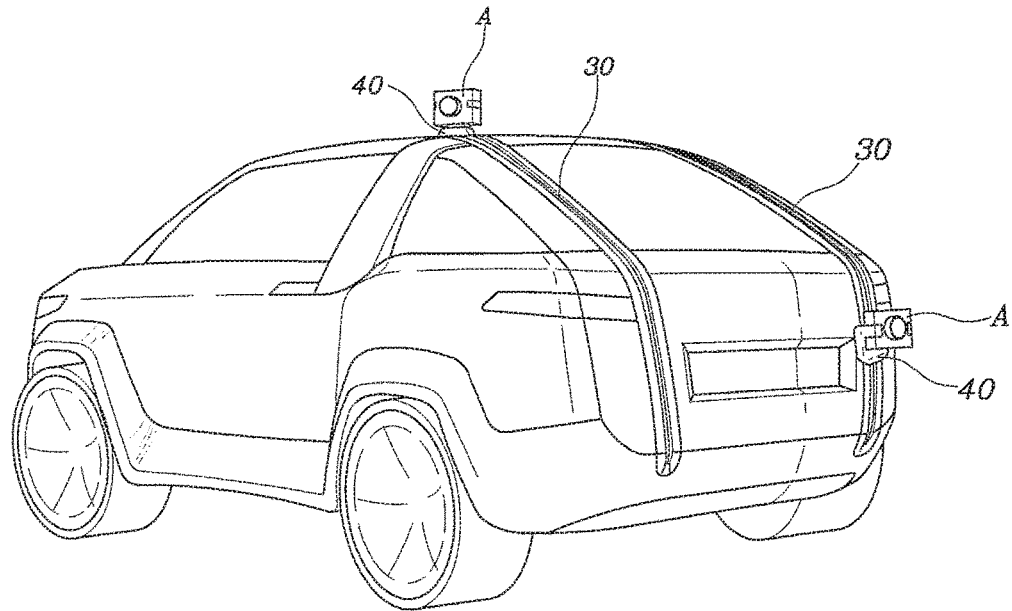
[FIG. 14]
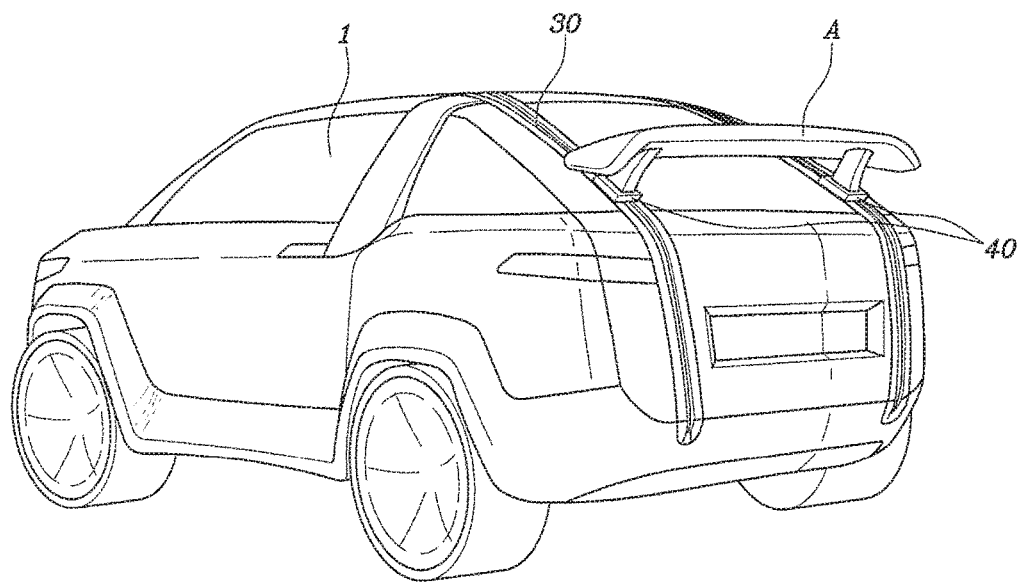

[FIG. 15]
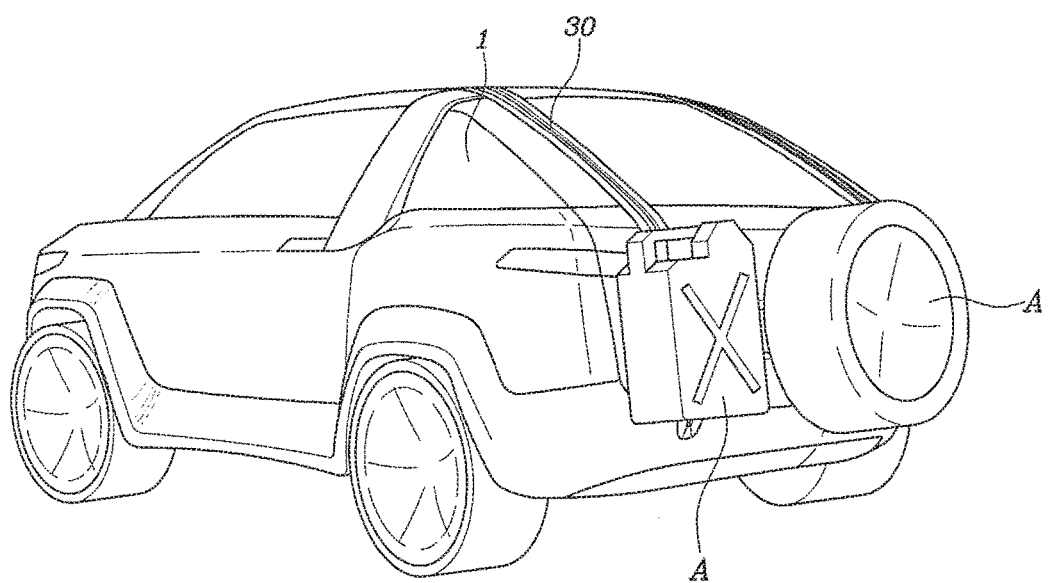

CARRIER APPARATUS FOR VEHICLES

CROSS-REFERENCE(S) TO RELATED APPLICATIONS

This application claims the benefit f priority to Korean Patent Application No. 10-2017-0094158, filed on Jul. 25, 2017, in the Korean Intellectual Property Office, the disclosure of which is incorporated herein by reference.

TECHNICAL FIELD

The present disclosure relates to a carrier apparatus for vehicles having a new loading structure for loading cargo on the outside of a vehicle, thereby securing indoor space and improving user convenience.

BACKGROUND

A vehicle has therein a space for loading cargo as well as a space for accommodating people. The cargo can be loaded in a rear seat or a trunk of the vehicle.

In recent years, bicycles, used as leisure means, or bulky cargo, such as camping equipment, have been loaded in vehicles. However, it is not possible to load very bulky cargo even though the rear seat or the trunk of the vehicle is used.

In order to solve this problem, various methods of loading cargo on the outside of a vehicle have been proposed. However, a method of fixing cargo to the roof panel of the vehicle has a problem in that it is very inconvenient to load the cargo. A method of loading cargo on the rear of the tailgate of the vehicle has a problem in that it is required to install a separate carrier apparatus, which is troublesome.

In addition, when cargo is loaded, it is necessary to manually install the carrier apparatus, and after the cargo is unloaded, the carrier apparatus must be removed, which is troublesome and inconvenient.

The matters disclosed in this section are merely for enhancement of understanding of the general background of the invention and should not be taken as an acknowledgment or any form of suggestion that the matters form the related art already known to a person skilled in the art.

SUMMARY

The present disclosure has been made in view of the above problems, and it is an object of the present disclosure to provide a carrier apparatus for vehicles configured to have a loading structure in which cargo is fixed to the outside of a vehicle, thereby securing indoor space, and such that the loading structure is cable of being adjusted electrically to simply fix various kinds of cargo, thereby improving user convenience.

In accordance with an aspect of the present disclosure, a carrier apparatus for a vehicle includes: a stationary rail extending from a rear side of a vehicle to an upper part of the vehicle in a forward-rearward direction of the vehicle; and a position-fixing bracket separably mounted to the stationary rail for fixing cargo placed on the stationary rail, such that the cargo fixed to the stationary rail is located at the rear part the upper part of the vehicle when the position-fixing bracket is mounted to the stationary rail.

When the stationary rail and the position-fixing bracket come into contact with each other, the position-fixing bracket may be mounted to the stationary rail by the attractive force therebetween.

The stationary rail or the position-fixing bracket may be made of an electromagnet such that an attractive force is generated therebetween when a signal is input.

A plurality of fixing sockets may be mounted in the stationary rail in the direction in which the stationary rail extends, and the position-fixing bracket may be inserted into one of the fixing sockets such that the position of the position-fixing bracket on the stationary rail is fixed.

A pair of stationary rails may be provided at opposite sides of the vehicle to be spaced apart from each other, and a plurality of position-fixing brackets may be provided, the position-fixing brackets being mounted to the stationary rails.

In another aspect of the present disclosure, a carrier apparatus for a vehicle includes: a transfer rail extending from the rear part of a vehicle to the upper part of the vehicle in a forward-rearward direction to reciprocate or rotate in the forward-rearward direction; and a mounting bracket separably mounted to the transfer rail for fixing cargo placed on the transfer rail, the mounting bracket being configured to move along the transfer rail when mounted to the transfer rail such that the cargo fixed to the transfer rail is located at the rear part or the upper part of the vehicle.

The transfer rail may automatically move in the forward-rearward direction when a signal is input.

The mounting bracket may include a moving socket mounted to the transfer rail to move along the transfer rail and a mounting seat separably mounted to the moving socket for fixing the cargo mounted to the mounting bracket.

When the transfer rail and the moving socket come into contact with each other, the moving socket may be mounted to the transfer rail by the attractive force therebetween.

One or more mounting sockets may be provided at the transfer rail in the direction in which the transfer rail extends, and the moving socket may be connected to one of the mounting sockets such that the moving socket is mounted to the transfer rail.

A mounting hole may be formed in the center of each of the mounting sockets, and the moving socket may be inserted and fixed into the mounting hole.

The mounting hole may be provided with an elastic support protrusion elastically protruding toward the center thereof, and the moving socket may be provided with a catching recess, into which the elastic support protrusion is inserted to be inserted by the catching recess.

Flaps may be turnably mounted at opposite sides of the mounting seat to fix the cargo placed on the mounting seat while wrapping the cargo.

A plurality of mounting brackets may be mounted to the transfer rail and spaced apart from each other in the forward-rearward direction in the transfer rail to fix the front side and the rear side of the cargo.

A pair of transfer rails may be provided at opposite sides of the vehicle and spaced apart from each other, and a plurality of mounting brackets may be provided and be mounted to the transfer rails.

The apparatuses and methods of the present disclosure have other features and other advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a view showing a carrier apparatus for vehicles according to a first embodiment of the present disclosure;

FIG. 2 and FIG. 3 are views for explaining the carrier apparatus for vehicles according to the first embodiment of the present disclosure shown in FIG. 1;

FIG. 4 is a view showing a carrier apparatus for vehicles according to a second embodiment of the present disclosure;

FIGS. 5 to 7 are views for explaining the carrier apparatus for vehicles according to the second embodiment of the present disclosure shown in FIG. 4; and FIGS. 8 to 15 are views showing various application examples of the carrier apparatus for vehicles according to the present disclosure.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the disclosure (s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a carrier apparatus for vehicles according to various exemplary embodiments of the present disclosure will be described with reference to the accompanying drawings.

FIG. 1 is a view showing a carrier apparatus for vehicles according to a first embodiment of the present disclosure, FIGS. 2 and 3 are views for explaining the carrier apparatus for vehicles according to the first embodiment of the Present disclosure shown in FIG. 1, FIG. 4 is view showing a carrier apparatus for vehicles according to a second embodiment of the present disclosure, FIGS. 5 to 7 are views for explaining the carrier apparatus for vehicles according to the second embodiment of the present disclosure shown in FIG. 4, and FIGS. 8 to 15 are views showing various application examples of the carrier apparatus for vehicles according to the present disclosure.

As shown in FIG. 1, a carrier apparatus for vehicles according to a first embodiment of the present disclosure includes a stationary rail 10 extending from a rear part of a vehicle 1 to an upper part of the vehicle 1 in a forward-rearward direction of the vehicle 1 and position-fixing bracket 20 separably mounted to the stationary rail 10 for fixing cargo A placed on the stationary rail 10, the position-fixing bracket 20 being configured such that the cargo A fixed to the stationary rail 10 is located at the rear part the upper part of the vehicle 1 when the position-fixing bracket 20 is mounted to the stationary rail 10.

Here, the rear part of the vehicle 1 may be a tailgate, and the upper part of the vehicle 1 may be a roof panel. The stationary rail 10 may extend from the rear part of the vehicle 1 to the upper part of the vehicle 1 so as to cross a rear glass and other components as well as the tailgate and the roof panel. The stationary rail 10 may extend to the front part of the vehicle 1. However, the stationary rail 10 extends from the rear part of the vehicle 1 to the upper part of the vehicle 1 in order to prevent the stationary rail 10 from obstructing a field of vision.

Meanwhile, the position-fixing bracket 20 is separably mounted to the stationary rail 10. The position-fixing bracket 20 may be mounted to a specific position on the stationary rail 10, extending in the forward-rearward direction, as desired by a user, whereby the position at which the cargo mounted may be adjusted in consideration of the size of the cargo A. The position-fixing bracket 20 may fix the cargo A placed on the stationary rail 10 such that the cargo n is fixed to the vehicle 1 via the stationary rail 10.

Consequently, the position-fixing bracket 20 may be mounted to the stationary rail 10, extending from the rear part of the vehicle 1 to the upper part of the vehicle 1, and the cargo A is placed on and fixed to the position-fixing bracket 20, whereby the position at which the cargo A is mounted may be adjusted in consideration of the size of the cargo A.

Specifically, as shown in FIGS. 2 and 3, when the stationary rail 10 and the position-fixing bracket 20 come into contact with each other, the position-fixing bracket may be mounted to the stationary rail 10 by the attractive force therebetween. That is, the position-fixing bracket 20 must be mounted and fixed to the stationary rail 10, and the stationary rail 10 and the position-fixing bracket 20 are configured such that, when the stationary rail 10 and the position-fixing bracket 20 come into contact with each other, the contact position thereof is fixed by the attractive force therebetween. Consequently, the cargo A placed on the position-fixing bracket 20 may be fixed to the vehicle 1 via the stationary rail 10.

Particularly, either the stationary rail 10 or the position-fixing bracket 20 may be made of an electromagnet such that an attractive force is generated therebetween when a signal is input. That is, the position-fixing bracket 20 must be securely fixed to the stationary rail in the state in which the cargo A is placed on the position-fixing bracket 20. To this end, the position-fixing bracket 20 may be made of a ferromagnetic material. In this case, however, it may be difficult for the user to separate the position-fixing bracket 20 from the stationary rail 10 in the state in which the position-fixing bracket 20 is mounted to the stationary rail 10.

Consequently, the stationary rail 10 or the position-fixing bracket 20 may be made of an electromagnet, in which case a magnetic force is generated such that the position-fixing bracket 20 is fixed to the stationary rail 10 in response to the user input of a signal, whereby user convenience is improved.

Here, only the stationary rail 10 may be made of an electromagnet, and the position-fixing bracket 20 may be made of a material that responds to magnetism. When a signal is input to the stationary rail 10 through switch manipulation, the stationary rail 10 may be magnetized such that the position-fixing bracket 20 is fixed to the stationary rail 10.

Meanwhile, as shown in FIG. 3, a plurality of fixing sockets 12 may be mounted in the stationary rail 10 in the direction in which the stationary rail 10 extends, and the position-fixing bracket 20 may be inserted into one of the fixing sockets 2 such that the position-fixing bracket 20 is positioned and fixed on the stationary rail 10.

Because a plurality of fixing sockets 12 is mounted the stationary rail 10 and the position-fixing bracket is inserted into one of the fixing sockets 12, the position-fixing bracket 20 may be fixed to the stationary rail 10 via the fixing socket 12. Each of the fixing sockets 12 may be provided with an insertion hole, into which the position-fixing bracket 20 is mounted by interference fitting. Various assembly structures including a catching structure, a protrusion structure, and a push-and-push structure, may be used to prevent the position-fixing bracket 20 from being separated from the fixing socket 12 after the position-fixing bracket 20 is inserted into the fixing socket 12.

A pair of stationary rails 10 may be provided at opposite sides of the vehicle 1 so as to be spaced apart from each other, and a plurality of position-fixing brackets 20 may be provided. The position-fixing brackets 20 may be mounted to the stationary rails 10. As a pair of stationary rails 10 is provided, it is possible to easily load the cargo A using the position-fixing brackets 20, mounted to the stationary rails 10, even when the volume of the cargo A is large. Consequently, it is possible to stably fix the cargo A depending on the size and shape of the cargo A.

As shown in FIG. 4, the carrier apparatus for vehicles according to the second embodiment of the present disclosure includes a transfer rail 30 extending from the rear part of a vehicle 1 to the upper part of the vehicle 1 in the forward-rearward direction so as to reciprocate or rotate in the forward-rearward direction and a mounting bracket 40 separably mounted to the transfer rail 30 for fixing cargo A placed on the transfer rail 30, the mounting bracket 40 being configured to move along the transfer rail 30 when mounted to the transfer rail 30 such that the cargo A fixed to the transfer rail 30 is located at the rear part or the upper part of the vehicle 1.

Here, the transfer rail 30 may extend from the rear part of the vehicle 1 so as to cross the upper part of the vehicle 1 such that the cargo A is located at the rear part or the upper part of the vehicle 1. The transfer rail 30 may reciprocate or rotate in the forward-rearward direction such that the mounting bracket 40 mounted to the transfer rail 30 moves to the front the rear of the transfer rail 30 and thus moves to the upper part or the rear part of the vehicle 1. To this end, the transfer rail 30 may include a chain or a belt that orbits according to the rotation of a plurality of sprockets disposed at intervals in the forward-rearward direction. Alternatively, as an example, a rack-and-pinion structure may be used to enable an object to move along the transfer rail 30, or a motor may be used to rotate the sprockets or the pinion such that the transfer rail 30 can operate electrically.

The mounting bracket 40 is separably mounted to the transfer rail 30. Because the mounting bracket 40 is separably mounted to the transfer rail 30, a mounting bracket 40 having a different fixing structure or form may be selectively used depending on the size or shape of cargo A to be loaded.

Consequently, a mounting bracket 40 suitable for the cargo A may be mounted to the transfer rail 30, and the position of the mounting bracket 40 may be changed through the rotation operation of the transfer rail 30 in the state in which the cargo A is fixed to the mounting bracket 40 such that the cargo A is fixed to an appropriate position of the vehicle 1.

Specifically, the transfer rail 30 may automatically move in the forward-rearward direction when a signal is input.

That is, the transfer rail 30 may move according to a command through switch manipulation. In the above example of the transfer rail 30, the motor may be controlled according to a command through switch manipulation. To this end, a controller for controlling the movement of the transfer rail 30 according to the command may be provided.

As the transfer rail 30 is configured so as to move electrically, the cargo A may be moved from the rear part of the vehicle 1 to the upper part of the vehicle 1 through a simple manipulation, whereby user convenience is improved.

Referring to FIG. 5 and FIG. 6, the mounting bracket 40 may include a moving socket 42 mounted to the transfer rail 30 so as to move along the transfer rail 30 and a mounting seat 44 separably mounted to the moving socket 42 for fixing the cargo A mounted to the mounting bracket 40.

When the mounting bracket 40 includes a moving socket 42 and a mounting seat 44, the moving socket 42 may be mounted to the transfer rail 30 so as to move according to the movement of the transfer rail 30, and the mounting seat 44 moves along with the moving socket 42 when the cargo A is fixed to the mounting seat 44, whereby the position of the cargo A is changed. The moving socket 42 and the mounting seat 44 may be integrally formed. Alternatively, the mounting seat 44 may have various shapes depending on the size or shape of the cargo A to be loaded, and a single moving socket 42 may be commonly used with mounting seats 44 having various shapes.

As can be seen from FIG. 5, when the transfer rail 30 and the moving socket 42 come into contact with each other, the moving socket 42 may be mounted to the transfer rail 30 by the attractive force therebetween. Here, the transfer rail 30 and the moving socket 42 may be made of a magnetic material. When the transfer rail 30 and the moving socket 42 come into contact with each other, the contact position thereof is fixed by the attractive force therebetween. Consequently, the moving socket 42 is fixed to the transfer rail 30.

Particularly, the transfer rail 30 or the moving socket 42 may be made of an electromagnet such that the moving socket 42 is fixed to the transfer rail 30 through switch manipulation.

As can be seen from FIG. 6, a plurality of mounting sockets 32 may be provided at the transfer rail 30 in the direction in which the transfer rail 30 extends, and the moving socket 42 may be connected to one of the mounting sockets 32 such that the moving socket 42 is mounted to the transfer rail 30.

As one or more mounting sockets 32 are provided at the transfer rail 30, the mounting sockets 32 also move when the transfer rail moves. A plurality of mounting sockets 32 may be provided at the transfer rail 30 such that the mounting sockets 32 are coupled to the chain or the belt, described above, so as to move along the transfer rail 30. As the moving socket 42 is inserted and fixed into one of the mounting sockets 32, the cargo A placed on the mounting bracket 40 may move along the transfer rail 30.

Specifically, a mounting hole 33 may be formed in the center of each of the mounting sockets 32, and the moving socket 42 may be inserted and fixed into the mounting hole 33.

In addition, the mounting hole 33 may be provided with an elastic support protrusion 34 elastically protruding toward the center thereof, and the moving socket 42 may be provided with a catching recess 43, into which the elastic support protrusion 34 is inserted so as to be caught by the catching recess 43.

Since a mounting hole 33 is formed in the center each of the mounting sockets 32, and the moving socket 42 is inserted into the mounting hole 33, the moving socket 42 may be fixed in the mounting hole 33 after being inserted into the mounting hole 33. Here, the mounting hole 33 is formed to have a polygonal shape such that the moving socket 42, inserted into the mounting hole 33, is fixed so as to be incapable of rotating.

In addition, as can be seen from FIG. 6, as the mounting hole 33 is provided with the elastic support protrusion 34 and the moving socket 42 is provided with a catching recess 43, into which the elastic support protrusion 34 is inserted so as to be caught by the catching recess 43, when the moving socket 42 is inserted into the mounting hole 33, the elastic support protrusion 34 may be inserted into the catching recess 43, whereby the moving socket 42 is prevented from being separated from the mounting hole 33. Furthermore, the elastic support protrusion 34 may elastically protrude from the mounting hole 33 by an elastic member, such as a spring, to allow the moving socket 42 to be inserted into the mounting hole 33. When the elastic support protrusion 34 is caught to the catching recess 43 in the moving socket 42, the position of the elastic support protrusion 34 is fixed such that the moving socket 42 is prevented from being separated from the mounting hole 33. Consequently, the mounting bracket 40 remains mounted to the transfer rail 30.

Meanwhile, as can be seen from FIG. 5 and FIG. 6, flaps 45 may be turnably mounted at the opposite sides of the mounting seat 44 to fix the cargo A placed on the mounting seat 44 while wrapping the cargo A. As a result, the cargo A may be placed on the mounting seat 44 in the state in which the flaps 45 are spread, and the flaps 45 may be folded to fix the cargo A while wrapping the cargo A, after the cargo A is placed on the mounting seat 44, whereby the cargo A may be fixed to the mounting bracket 40. The flaps 45 may elastically turn from the opposite ends of the mounting seat 44 so as to come close to each other such that the cargo A can be securely fixed by elastic force. In addition, the flaps 45 may be made of a frictional material or a frictional material having magnetism such that the cargo A can be securely fixed. The flaps 45 may be configured to elastically turn so as to come close to each other.

In addition to the flaps 45, a clamping seat or a fixing wire may be provided at the mounting seat 44 in order to more securely fix the cargo A. In the case in which the cargo A is a bicycle, the wheels of the bicycle may be fixed such that the bicycle can be easily loaded.

Meanwhile, as shown in FIG. 7, the mounting bracket 40 may be configured so as to be coupled to a carrier box or another fixing mechanism such that various kinds of cargo A can be loaded, in addition to the bicycle. That is, as can be seen from FIG. 7, the mounting bracket 40 may be coupled to the lower surface of a carrier box such that the mounting bracket 40 can be mounted to the transfer rail, whereby the carrier box can be loaded on the vehicle. In addition, the mounting bracket 40 may be integrally formed with the carrier box as one configuration. Alternatively, the mounting bracket 40 may be formed separately from the carrier box such that the mounting bracket 40 can be coupled to cargo A other than the carrier box.

Meanwhile, a plurality of mounting brackets 40 may be provided. The mounting brackets 40 may be mounted to the transfer rail 30 in the state of being spaced apart from each other in the forward-rearward direction in order to fix the front side and the rear side of the cargo A.

For example, the cargo A may be a bicycle, and a plurality of mounting brackets 40 may be provided at a single transfer rail 30 to fix the front wheel and the rear wheel of the bicycle. In the present disclosure, the transfer rail 30 is configured to turn or move electrically, and therefore, the bicycle can be more easily loaded.

The loading of the bicycle will be described with reference to the drawings. As shown in FIG. 8, the front wheel of the bicycle is fixed to one of the mounting brackets 40 at the rear part of the vehicle 1. When the transfer rail 30 is moved, as shown in FIG. 9, in this state, the bicycle is lifted up to the upper part of the vehicle 1 along the transfer rail 30. Subsequently, as shown in FIG. 10, the rear wheel of the bicycle is fixed to another of the mounting brackets 40, whereby the bicycle can be loaded on the vehicle 1.

In addition, since the transfer rail 30 moves electrically, it is possible to locate the bicycle at the upper part of the vehicle 1 once the bicycle is fixed at the rear part of the vehicle 1, whereby user convenience is improved.

Meanwhile, a pair of transfer rails 30 may be provided at opposite sides of the vehicle 1 so as to be spaced apart from each other, and a plurality of mounting brackets 40 may be provided. The mounting brackets 40 may be mounted to the transfer rails 30. Consequently, it is possible to fix the cargo A to the mounting brackets 40, provided at the transfer rails 30, even when the volume of the cargo A is large, whereby it is possible to securely fix the cargo A to the vehicle 1. In addition, several pieces of cargo A may be loaded.

For example, in the case in which the cargo A is a large carrier box, opposite sides of the carrier box may be fixed to the mounting brackets 40 provided at the transfer rails 30, whereby the carrier box can be stably loaded on the vehicle 1.

The loading of the carrier box will be described with reference to the drawings. As shown in FIG. 11, the carrier box is fixed to the mounting brackets 40, provided at the transfer rails 30, at the rear part of the vehicle 1. Since the large carrier box is fixed at the rear part of the vehicle 1, user convenience is improved. When the transfer rails 30 are moved, as shown in FIG. 12, in this state, the carrier box is moved to the upper part of the vehicle 1 along the transfer rails 30. Consequently, it is possible to locate the carrier box at a desired position of the vehicle 1, e.g. the lower part or the upper part of the vehicle 1.

In another embodiment, as shown in FIG. 13, cameras may be mounted to the mounting brackets 40 provided at the respective transfer rails 30 such that the cameras can be used for crime prevention or capturing the scenes of the surroundings. As shown in FIG. 14, a spoiler may be mounted to the mounting brackets 40. Particularly, the position of the mounting brackets 40 is capable of being adjusted according to the movement of the transfer rails 30. Consequently, the flow of air may be controlled through the adjustment of the position of the spoiler depending on the driving speed and driving conditions.

In addition, as shown in FIG. 15, several pieces of different kinds of cargo A, such as a spare tire and an emergency fuel tank, may be loaded.

As is apparent from the above description, in the carrier apparatus for vehicles having the structure described above, the cargo is moved along the rails extending from the tailgate, which is the rear part of the vehicle, to the roof panel, which is the upper part of the vehicle, thereby solving inconvenience due to the height difference when the cargo is loaded and securing indoor space.

In addition, the position of the cargo loaded on the vehicle is automatically adjusted, whereby user convenience is improved and high quality is achieved.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present disclosure have been presented purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present disclosure, as well as various alternatives and modifications thereof. It is intended that the scope of the invention be defined by the Claims appended hereto and their equivalents.

What is claimed is:

1. A carrier apparatus installed on a vehicle, the carrier apparatus comprising:
    a transfer rail extending from a tailgate of the vehicle to a roof panel of the vehicle in a forward-rearward direction of the vehicle; and
    a mounting bracket separably mounted to the transfer rail for fixing cargo placed on the transfer rail, the mounting bracket moving along the transfer rail when mounted to the transfer rail such that the cargo fixed to the transfer rail is located at the tailgate or the roof panel of the vehicle,
    wherein the transfer rail includes a transferring device configured to move the mounting bracket along the transfer rail,
    wherein the transferring device includes at least one of a chain, a belt and a rack-and-pinion structure,
    wherein the mounting bracket comprises:
        a moving socket mounted to the transfer rail to move along the transfer rail; and
        a mounting seat separably mounted to the moving socket for fixing the cargo mounted to the mounting bracket,
    wherein flaps are turnably mounted at opposite sides of the mounting seat to fix cargo placed on the mounting seat—while wrapping the cargo,
    wherein the cargo is placed on the mounting seat when the flaps are spread, and the flaps are folded after the cargo is placed on the mounting seat to fix the cargo to the mounting bracket,
    wherein the flaps elastically turn from the opposite sides of the mounting seat to come close to each other such that the cargo is securely fixed by elastic force,
    wherein the flaps include a frictional material or a frictional material having magnetism such that the cargo is securely fixed by frictional force or magnetic force,
    wherein the transfer rail further comprises a mounting socket including first and second surfaces,
    wherein the first surface of the mounting socket is fixedly coupled to the transfer rail,
    wherein a mounting hole is formed in a center of the second surface of the mounting socket,
    wherein the mounting hole is open toward an upper direction of the mounting socket, such that a lower portion of the moving socket is inserted into the mounting hole,
    wherein two elastic support protrusions elastically protrude from respective upper and lower edges of the mounting hole toward a center of the mounting hole, and
    wherein the moving socket has a catching recess surrounding the lower portion of the moving socket, such that the two elastic support protrusions are inserted into the catching recess to fix the lower portion of the moving socket in the mounting hole.

2. The carrier apparatus according to claim 1, wherein the transfer rail automatically moves in the forward-rearward direction when a signal is input by a user.

3. The carrier apparatus according to claim 1, wherein, when the transfer rail and the moving socket come into contact with each other, the moving socket is mounted to the transfer rail by an attractive force therebetween.

4. The carrier apparatus according to claim 1, wherein a plurality of mounting brackets are mounted to the transfer rail and spaced apart from each other in the forward-rearward direction, the plurality of mounting brackets fixing a front side and a rear side of the cargo.

5. The carrier apparatus according to claim 1, wherein the transfer rail comprises: a pair of transfer rails disposed at opposite sides of the vehicle and spaced apart from each other, and
    at least one mounting bracket is mounted to each of the pair of the transfer rails.

* * * * *